No. 621,201. Patented Mar. 14, 1899.
C. H. BAKER.
CHECK ROW CORN PLANTER.
(Application filed June 13, 1898.)
(No Model.) 4 Sheets—Sheet 1.
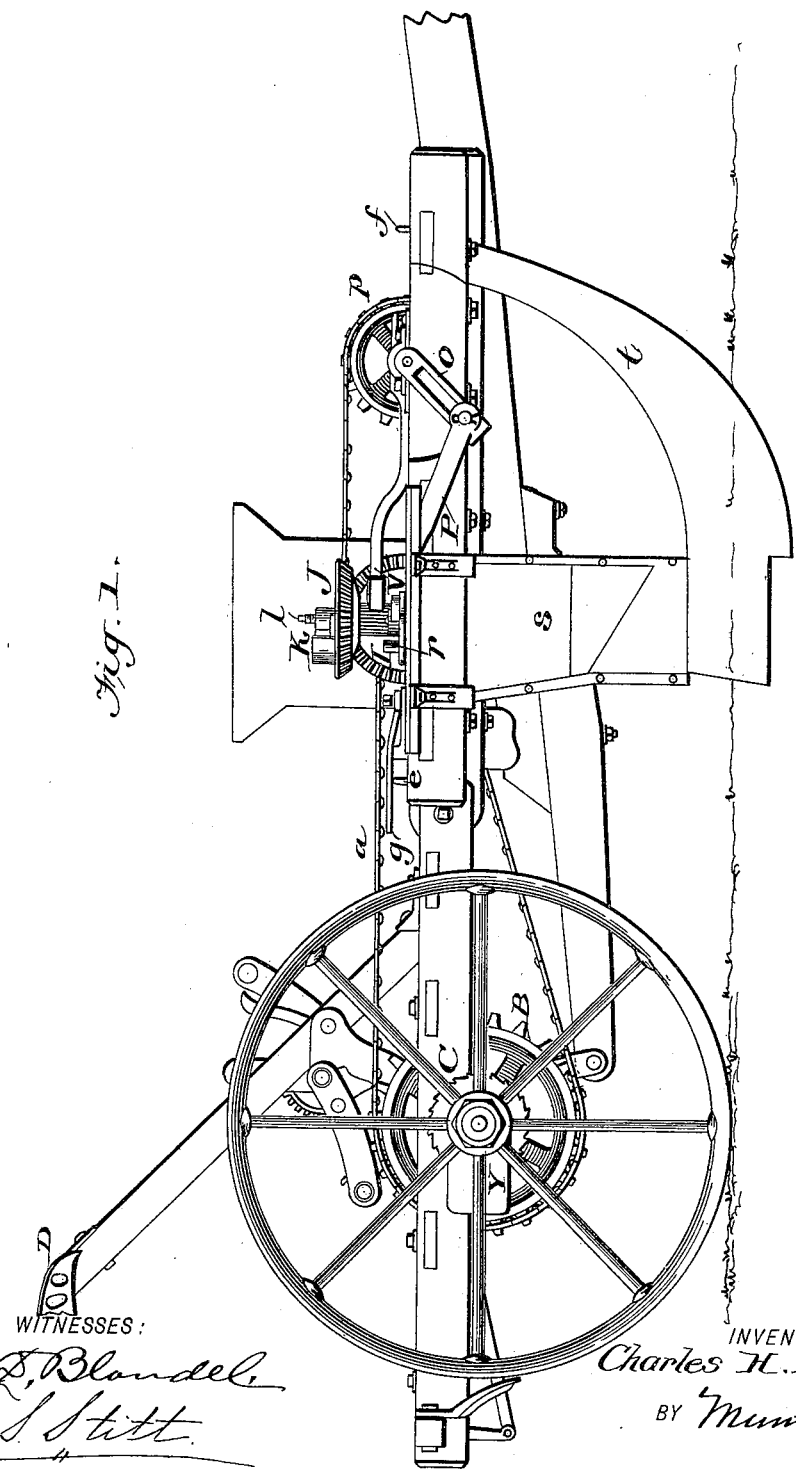
WITNESSES:
INVENTOR
Charles H. Baker.
BY Munn & Co.
ATTORNEYS.

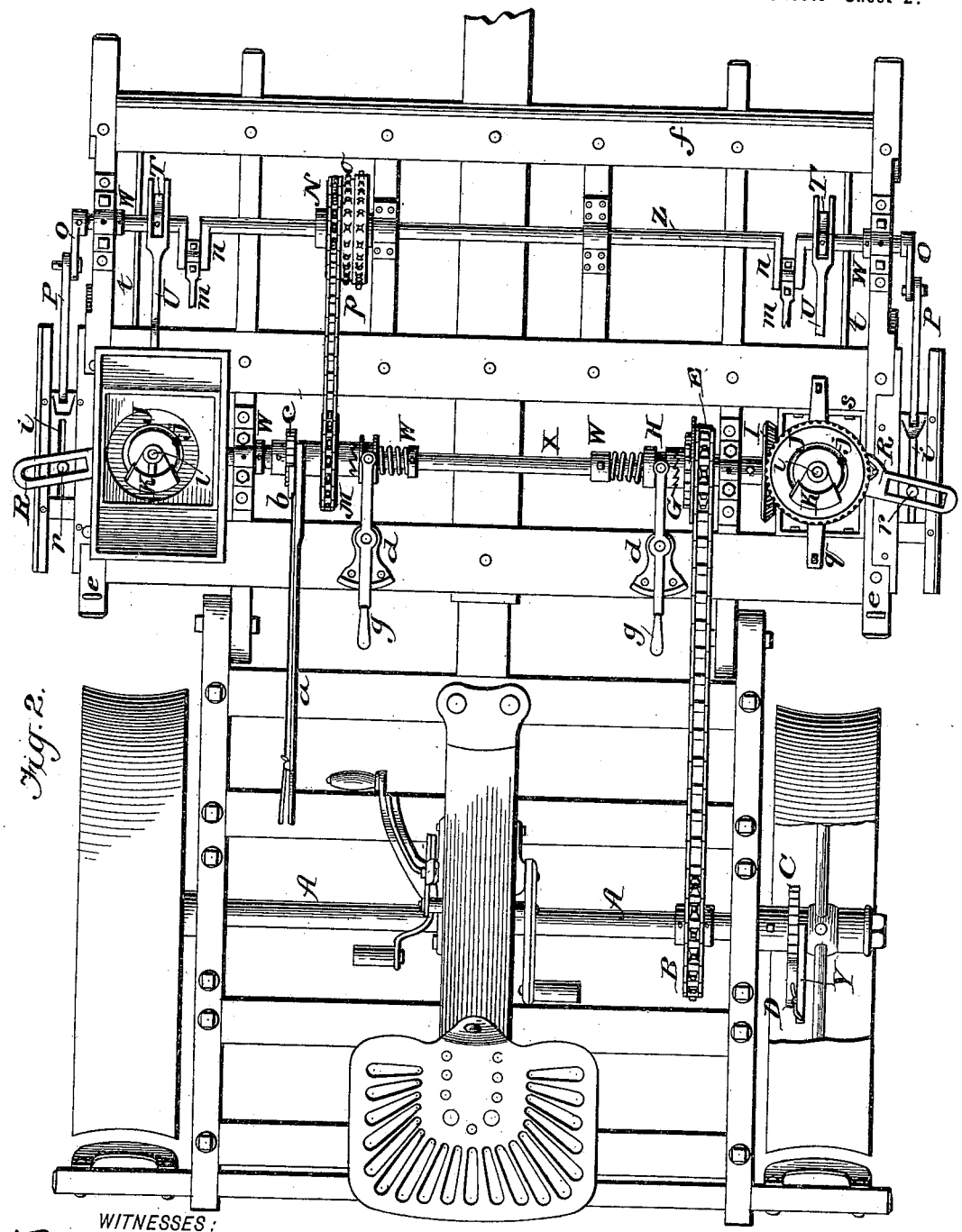

No. 621,201. Patented Mar. 14, 1899.
C. H. BAKER.
CHECK ROW CORN PLANTER.
(Application filed June 13, 1898.)
(No Model.) 4 Sheets—Sheet 3.
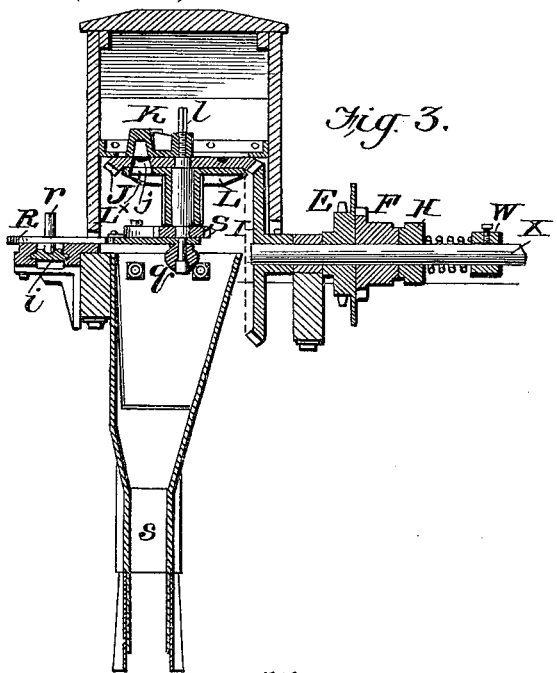
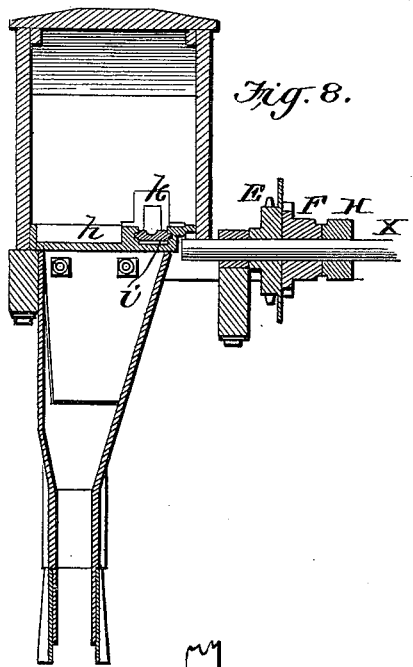
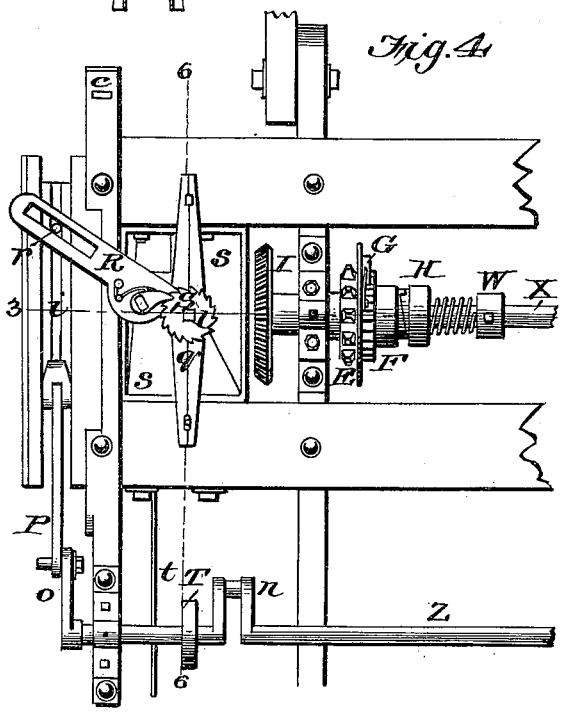
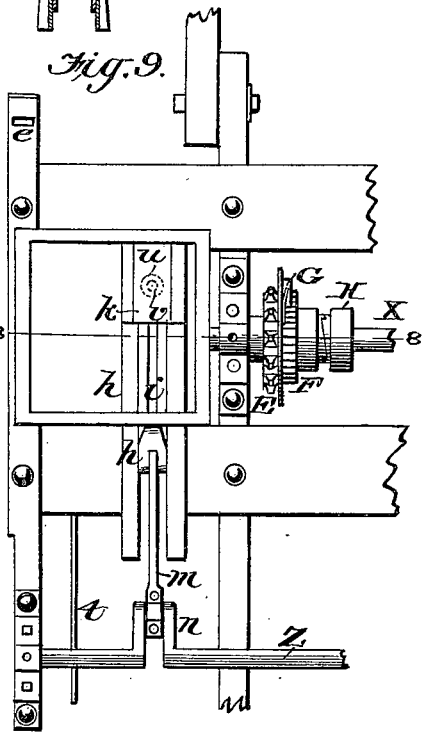
WITNESSES:
INVENTOR
Charles H. Baker.
BY Munn & Co,
ATTORNEYS.

No. 621,201. Patented Mar. 14, 1899.
C. H. BAKER.
CHECK ROW CORN PLANTER.
(Application filed June 13, 1898.)
(No Model.) 4 Sheets—Sheet 4.
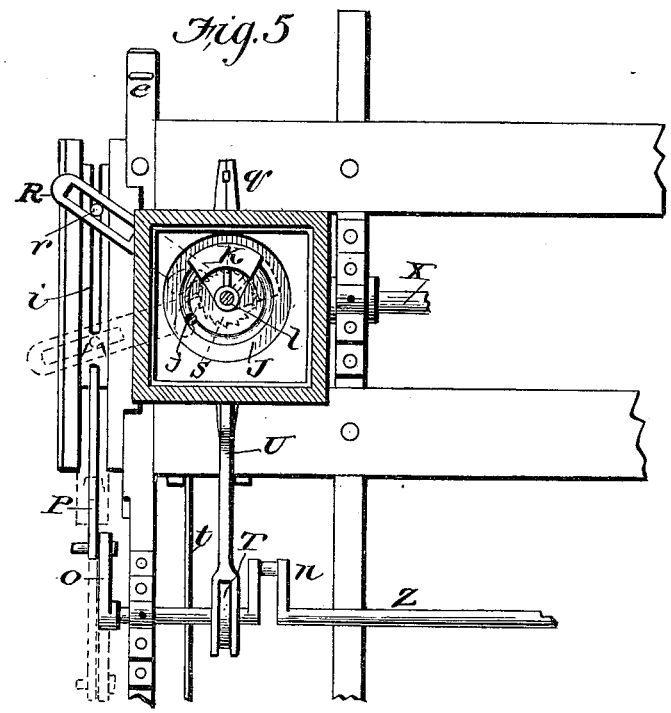
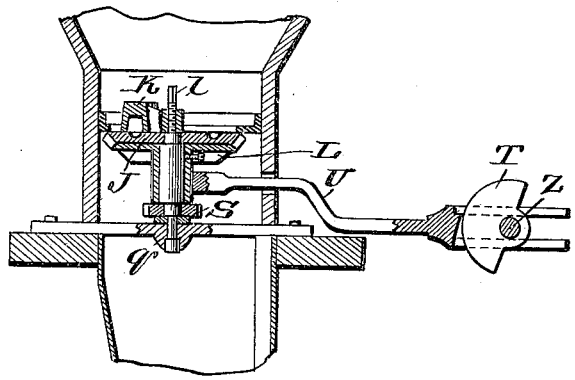
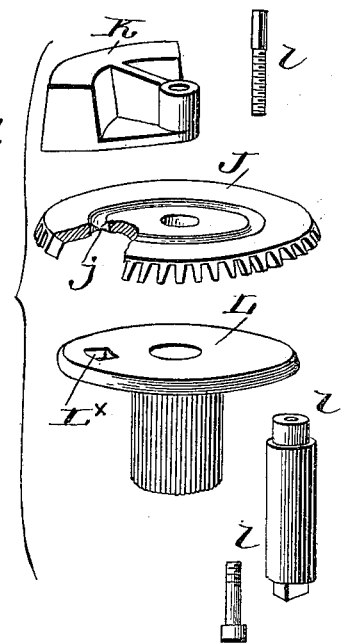
WITNESSES:
INVENTOR
Charles H. Baker
BY Munn & Co.
ATTORNEYS.

UNITED STATES PATENT OFFICE.

CHARLES H. BAKER, OF ST. JAMES, MISSOURI.

CHECK-ROW CORN-PLANTER.

SPECIFICATION forming part of Letters Patent No. 621,201, dated March 14, 1899.

Application filed June 13, 1898. Serial No. 683,388. (No model.)

*To all whom it may concern:*

Be it known that I, CHARLES H. BAKER, of St. James, in the county of Phelps and State of Missouri, have invented a new and useful Improvement in Check-Row Corn-Planters, of which the following is a specification.

My invention relates to corn-planters, and has for its object the production of a machine which is capable of varying the distance between the points at which the corn is dropped in an effective and simple manner, the variations being accurately determined and of very wide range.

With this object in view my invention consists in the construction and arrangement of the parts which I shall first describe and then particularly point out the novel features in the appended claims.

Reference is to be had to the accompanying drawings, forming part of the specification, in which—

Figure 1 is a side elevation of my improved corn-planter with the hopper at the right side of the device removed. Fig. 2 is a plan view of the same. Fig. 3 is an enlarged detail vertical section on the line 3 3, Fig. 4. Fig. 4 is a plan view of that part of the device shown in Fig. 3 with all parts above the ratchet-wheel S removed. Fig. 5 is a detail plan view illustrating the drop mechanism in different operations. Fig. 6 is a detail sectional view on the line 6 6, Fig. 4, the parts above the ratchet-wheel S being in place. Fig. 7 is a detail view illustrating in perspective the disassembled parts of the drop mechanism. Fig. 8 is a detail vertical section illustrating a modification of the drop mechanism on line 8 8, Fig. 9; and Fig. 9 is a plan view of the same.

Referring especially to Fig. 2, it will be seen that my improved planter comprises two main parts or frames coupled together, as shown. The rear frame, which is the supporting, elevating and lowering, and traveling part of the planter, provided with traveling wheels, elevating-levers, brakes, driver's seat, and draftpole, which latter extends through to the front of the planter, forms no part of my present invention, and hence need not be specifically described in this application, its construction and operation being well known; but my invention does reside in the front or runner frame or section which supports the seed-dropping mechanism, which latter I shall now describe. This front frame is composed of a series of transverse bars intersected at right angles with other bars, which latter bars support bearings for two transverse shafts X and Z. Near the right end of the shaft X and loosely mounted thereon is a sprocket-wheel E, connected by chain-gearing with a sprocket-wheel B, keyed on the main driving-shaft A, which supports the wheels of the traveling or rear sections. A spring-actuated clutch H is mounted on the shaft adjacent the sprocket-wheel E, the clutch being thrown in contact with such sprocket-wheel to operatively connect the two shafts A and X by the spring bearing against a stop-sleeve W and being released therefrom to uncouple the said shafts and held uncoupled by the lever $g$ engaging with the rack-plate $d$, secured on the rear cross-bar of the front section or frame.

The driving mechanism above described I shall call the "principal" driving mechanism to distinguish it from the auxiliary mechanism hereinafter described.

On each side of the frame, adjacent the ends of the shaft X, the hoppers or boxes for the corn are placed, and below these hoppers or boxes are secured the chutes $s$ and the two pairs of sled-runners or furrow-openers $t$, the latter curving upwardly and forwardly from their ground ends and being fastened to the forward cross-bar of the front section. Cross-bars $q$ extend across the tops of the chutes $s$, as shown principally in Figs. 2, 3, and 4, and in these cross-bars are fitted to rotate about vertical axes spindles $l$, which support the feed-dropping devices. These latter being the same in both feed-boxes, it will be necessary to describe but one. On each spindle $l$ are keyed so as to move therewith a drop-plate L with a single orifice $L^\times$ therein, a cut-off K, located directly above the orifice in the drop-plate, and between the cut-off K and drop-plate L a feed-wheel J is loosely mounted on the shaft and provided with a single feed-orifice $j$, located a distance from the spindle equal to the distance of the orifice in the drop-plate from said spindle. It will be seen, therefore, that when the hopper contains corn it will be cut off by K and dropped through the orifice $L^\times$ in the drop-plate at every revolution of the feed-wheel J. This feed-wheel J is rotated by means of a bevel-wheel I, keyed on the ends of the shaft X and meshing with teeth on its periphery, the said shaft X being driven by the principal driving mechanism heretofore described. Now it will be seen that by the arrangement of all the parts described above the planter will drop seed at equal intervals of time, the length of such intervals depending entirely upon the excess of teeth on either of the sprocket-wheels B or E, or, in other words, upon the relative rate of rotation of the shaft X and of course the feed-wheel J.

In practice I usually make the main driving-wheel eighty-eight inches in circumference and so arrange the sprocket-wheel on the shaft X that the shaft A will make one-half revolution while the shaft X is making one complete revolution. Thus the principal driving mechanism will operate the planter in its ordinary operation to drop seed at every half-revolution of the shaft A, or, in other words, at intervals of one-half eighty-eight inches, or three feet eight inches. It is to be understood that I do not limit myself to this exact relative rotation of the two shafts A and X, but that I may replace the sprocket-wheels by others of different sizes, thereby increasing or diminishing this normal interval or distance of three feet eight inches, which I have said I usually employ. It is the main purpose of this invention, however, to enable the operator by simple means and without changing the gear of the two main sprocket-wheels to increase and diminish the intervals between the points at which the seed is dropped. To accomplish this end, the auxiliary driving mechanism, operated from the shaft Z, is brought into play. I shall proceed to describe the specific means employed. Referring to Figs. 3 and 4, it will be seen that a ratchet-wheel S is keyed on the spindle $l$ immediately below the depending hub of the drop-plate L, and below such ratchet-wheel S is a lever R, loosely mounted on the spindle and provided with a spring-pressed pawl adapted to engage the teeth of the ratchet-wheel. The outer end of the lever R extends through the hopper to the outside thereof and is there provided with a longitudinal slot, in which is adapted to work a pin $r$ on a reciprocating slide $i$, fitted in guides on the side of the frame. This slide $i$ is reciprocated by means of a pitman P, connected to a longitudinally-slotted crank O on the end of the shaft Z. The shaft Z is operatively connected with the shaft X by a sprocket-chain from sprocket-wheels N and M, the gearing being coupled and uncoupled by a spring-actuated clutch similar to the clutch for the principal driving mechanism. The operation of this part of the device is as follows: It must be remembered that the cut-off K, drop-plate L, and ratchet-wheel S are all rigidly secured on the spindle $l$, while the feed-wheel J and lever R are loose on the same; further, that the feed-plate J drops seed only when its orifice $j$ comes under the cut-off K and over the orifice L$^\times$ in the drop-plate L. It will then be evident that when both shafts X and Z are rotating the crank O on the latter will reciprocate the pitman P and slide $i$, thereby communicating motion through the pin $r$ to the lever R, which latter will by means of its pawl intermittently engage with and turn the ratchet-wheel S and spindle $l$ with the cut-off K and drop-plate L. This movement occurs at every revolution of the shafts Z and X, and the direction of the movement is in the same direction in which the orifice $j$ of the feed-wheel is moving. It follows, therefore, that when the cut-off K and drop-plate L are moved forward at every revolution of the feed-wheel it takes the orifice $j$ in the latter a longer time to catch up with the cut-off K and orifice in the drop-plate L in order to deliver its seed, and the intervals between the "droppings" are lengthened. In order to vary this increase in the intervals as desired, the pin $r$ of the pitman P is moved up or down in the slotted crank O, which will alter or vary the throw of the lever R and the consequent movement of the cut-off K and drop-plate L, and if it be desired to decrease the interval below that effected by the principal driving mechanism it is only necessary to change the levers R, sprocket-wheel S, and spindle $l$ from one side of the planter to the other, which will of course effect a movement of the cut-offs and drop-plates in a direction opposite to that in which the feed-wheel is moving, and thus decrease the intervals between the points of meeting of the cut-off, orifice in the drop-plate, and orifice in the feed-wheel.

In order to insure the positive movement of the spindle $l$ and concomitant parts in but one direction, I mount a cam-wheel T on the shaft Z, the said wheel engaging with a check-rod U (whose one end is forked and embraces the shaft Z) every time lever R is reversed from the ratchet-wheel S, and thereby causes the opposite end of said check-rod to engage with and hold the spindle $l$ from moving backward.

Instead of using my improved planter as a rotary feed device I may transform it into a slide drop device by removing the cross-bar $q$ and spindle $l$ and the rotary parts it supports and covering the bottom of the hopper with a plate $h$, having a drop-orifice $u$ in it and a guideway extending on each side of said drop-orifice. A cut-off $k$ covers this orifice. (See Fig. 9.) I then remove the slide $i$ from its usual place, take the pin $r$ therefrom, which leaves an orifice $v$ extending through the slide, and fit the slide in the guideways in the plate $h$. The slide is then connected by a pitman $m$ with the crank $n$ on the shaft Z and is thereby reciprocated, forming a reciprocating slide-planter. In order to vary the reciprocation of the slide $i$ in this connection, I employ sprocket-wheels $o$ $p$ adjacent the sprocket-wheel N and of different sizes.

While the sprocket-wheels $p$ and $o$ are intended primarily for use in connection with the modification referred to above, it is to be understood that they may also be used in connection with the rotary drop regulating or varying mechanism, if it be desired.

The lever *a b c*, mounted on the shaft X, is used to turn said shaft when it is desired to drop seed without moving the traveling wheels of the planter—as, for instance, in taking by a row where it had been broken off for any cause or in starting the machine at any place which is determined from where the marker was taken up on the last row planted.

The marker (not shown) is to be carried directly opposite or in line with the shaft X, and one end is hooked to *e*, Fig. 2, a rope being attached to the other end of the marker, while the other end of the rope is tied to a ring which slides along the rod *f* at the front of the frame. By this means the rope needs no attention at the end of the rows.

To recapitulate, the principal driving mechanism, comprising the shafts A and X, sprocket-wheels B and E, connected by chain-gearing, and bevel gear-wheel I, rotates the feed-wheel J, which latter drops seed every time its orifice *j* comes in line with cut-off K and orifice $L^x$ in drop-plate L. Now if it is desired to increase such interval the auxiliary driving mechanism, comprising shafts X and Z, sprocket-wheels M and N, connected by chain-gearing, is thrown into gear by means of the clutch, and every rotation of the shaft Z causes a reciprocation of slide *i* and a thrust of the lever R against ratchet-wheel S to turn the same and the cut-off K and drop-plate L in the same direction in which the feed-wheel J is being moved by the shaft X, &c., whereupon it takes the orifice *j* a longer time to come up with the cut-off and orifice in the drop-plate to deliver its seed, thereby increasing the interval between the droppings.

If it be desired to vary the throw of the lever to further increase or to decrease the movement of the cut-off and drop-plate, the pin of the pitman is adjusted in the crank O, and if it be desired to decrease instead of to increase the intervals the spindles *l* and their concomitant parts are changed or reversed, thereby causing the spindles, &c., to move toward the orifices in the feed-wheel instead of away from the same.

It will be observed that I have produced a planter capable of a very wide range of usefulness. Not only can the intervals between the droppings be varied at random, but it is possible to accurately measure the exact adjustment of the parts necessary for any given distance between the droppings.

Having thus described my invention, what I claim as new, and desire to secure by Letters Patent, is—

1. In a planter, the combination with a rotary feed device, and means for continuously rotating the same, of a rotatable drop-plate, and means for imparting movement to said drop-plate as and for the purpose set forth.

2. In a seed-planter, the combination of a movable drop-plate, driving devices for intermittently moving the same, and means for varying the action of said driving devices whereby to increase and decrease the intervals at which said drop-plate is moved, as set forth.

3. In a planter, the combination with a rotary feed-wheel, and means for giving a continuous rotation thereto, of a rotatable drop-plate and means for imparting an intermittent rotary motion to said drop-plate, as set forth.

4. In a planter, the combination with a rotary feed-wheel and means for imparting a continuous rotary motion thereto, of a rotatable drop-plate mounted below said feed-wheel, means for imparting an intermittent motion to said drop-plate and means for varying the length of each movement of said drop-plate, as set forth.

5. In a planter, the combination with a rotary feed-wheel, and means for imparting a continuous rotary motion thereto, of a rotatable cut-off and drop-plate mounted one on each side of said feed-wheel, as set forth.

6. In a planter, the combination with a rotary feed-wheel, and means for imparting a continuous rotary motion thereto, of a rotatable cut-off and drop-plate mounted one on each side of said feed-wheel, and means for automatically imparting an intermittent, simultaneous and equal movement to said cut-off and drop-plate, as set forth.

7. In a planter, the combination with a rotary feed-wheel, a shaft for imparting a continuous rotary movement thereto, of a rotatable drop-plate mounted below said feed-wheel, means for imparting an intermittent rotary motion to said drop-plate, the said means being driven from the shaft which imparts motion to the feed-wheel, as set forth.

8. In a planter, the combination of a rotary feed-wheel, a shaft operatively connected with said feed-wheel whereby to give a continuous rotary motion thereto, a rotatable drop-plate mounted below said feed-wheel, a second shaft mounted in alinement with said first shaft, gearing connecting the two shafts whereby they may rotate simultaneously, and devices connecting said second shaft with said drop-plate and imparting an intermittent movement thereto, as set forth.

9. In a corn-planter, the combination with the frame, of a feed-box or hopper, a vertical spindle rotatably mounted therein, a drop-plate and cut-off rigidly secured on said spindle, a feed-wheel loose on said spindle and between the cut-off and drop-plate means for imparting a continuous rotary motion to said feed-wheel, and means for moving said spindle whereby to move the said cut-off and drop-plate, as set forth.

10. In a corn-planter, the combination with the frame, of a spindle mounted to rotate about a vertical axis on said frame, a ratchet-wheel keyed on said spindle, a drop-plate keyed on said spindle above said ratchet-wheel, a feed-wheel loose on said spindle above said drop-plate, means for rotating said feed-wheel, a cut-off keyed on said spindle above said feed-wheel, and a lever provided with a pawl adapted to engage with said ratchet-wheel whereby to rotate said spindle, as and for the purpose set forth.

11. In a planter, the combination with the frame of a spindle on said frame and mounted to rotate about a vertical axis, a rotary feed-wheel loosely mounted on said spindle, a rotatable drop-plate carried on said spindle below said feed-wheel, a ratchet-wheel rigidly secured on said spindle, a lever loosely mounted on said spindle and provided with a pawl adapted to engage with said ratchet-wheel, the outer end of said lever being formed with an elongated slot, a slide mounted in guideways on the frame and having a pin fitted to work in said slot, means for rotating said feed-wheel, and means for reciprocating said slide whereby to cause said lever to turn the spindle and the drop-plate carried thereby, as set forth.

12. In a planter, the combination with the frame, of a spindle mounted to rotate thereon, a rotary feed-wheel loosely mounted on said spindle, a drop-plate carried by said spindle, a ratchet-wheel rigidly secured on said spindle, a lever on said spindle and provided with a pawl adapted to engage with said ratchet-wheel, the outer end of said lever being formed with an elongated slot, a slide fitted in guideways on the frame and provided with a pin fitted to work in said slot, a shaft mounted on the frame and connected with said feed-wheel to rotate the same, a second shaft mounted on the frame and provided with a crank, a pitman connecting said crank with said slide, and means for driving the two shafts, as set forth.

13. In a planter, the combination with a rotatable drop-plate, of a pawl-and-ratchet mechanism for intermittently operating the same, a slide adapted to impart a reciprocating motion to said mechanism, a pitman connected with said slide, a shaft mounted to rotate and provided with a slotted crank, and a pin in said slot and connected with said pitman, whereby the throw of the lever may be regulated, as set forth.

14. In a planter, the combination with the rotary feed-wheel and means for rotating the same, of a rotatable drop-plate, a pawl-and-ratchet mechanism for rotating the drop-plate, a shaft for operating said pawl-and-ratchet mechanism, and a check-rod operated from said shaft and adapted to prevent a back movement of said drop-plate, as and for the purpose set forth.

15. In a planter, the combination with the rotary feed-wheel and means for rotating the same, of a rotatable drop-plate, a pawl-and-ratchet mechanism for rotating said drop-plate, a shaft for imparting motion to said pawl-and-ratchet mechanism, a forked rod straddling said shaft and a cam on said shaft and adapted to engage with said rod to throw the latter into engagement with said drop-plate, as set forth.

CHARLES H. BAKER.

Witnesses:
JAMES B. HAYES,
JOHN L. LOVELACE.